United States Patent
Rockwood

(10) Patent No.: US 6,468,028 B1
(45) Date of Patent: Oct. 22, 2002

(54) VERTICAL PUMP WITH OIL LUBRICANT; C-SEAL FOR PUMP; AND PUMP WITH THREADED SHAFT POSITION ADJUSTMENT

(75) Inventor: Robert E. Rockwood, Windham, NH (US)

(73) Assignee: Environamics Corporation, Hudson, NH (US)

( * ) Notice: Subject to any disclaimer, the term of this patent is extended or adjusted under 35 U.S.C. 154(b) by 0 days.

(21) Appl. No.: 09/427,692

(22) Filed: Oct. 27, 1999

(51) Int. Cl.[7] .................................................. F03B 11/00
(52) U.S. Cl. ...................... 415/58.4; 415/111; 415/175; 415/229
(58) Field of Search ................................ 415/58.4, 110, 415/111, 175, 229; 184/6.18, 11.1, 11.2; 417/228

(56) References Cited

U.S. PATENT DOCUMENTS

| | | | |
|---|---|---|---|
| 2,003,168 A | * 5/1935 | Allen | 415/198.1 |
| 2,349,131 A | * 5/1944 | Anderson | 384/415 |
| 3,220,352 A | * 11/1965 | Smith et al. | 415/148 |
| 3,318,644 A | * 5/1967 | Johnson, III | 384/415 |
| 3,612,548 A | 10/1971 | Tracy | |
| 3,850,550 A | 11/1974 | Kaessen | |
| 4,328,973 A | 5/1982 | Delbridge | |
| 4,700,808 A | * 10/1987 | Haentjens | 184/6.18 |
| 5,203,575 A | 4/1993 | Azibert, et al. | |
| 5,340,273 A | 8/1994 | Rockwood | |
| 5,484,267 A | 1/1996 | Rockwood | |
| 5,513,964 A | 5/1996 | Rockwood | |
| 5,553,867 A | 9/1996 | Rockwood | |
| 5,591,020 A | 1/1997 | Rockwood | |
| 5,642,888 A | 7/1997 | Rockwood | |
| 5,647,735 A | 7/1997 | Rockwood | |
| 5,772,396 A | 6/1998 | Rockwood | |
| 5,779,005 A | * 7/1998 | Jones, Jr. et al. | 184/6.18 |
| 5,823,744 A | 10/1998 | Rockwood | |

* cited by examiner

Primary Examiner—Edward K. Look
Assistant Examiner—Ninh Nguyen
(74) Attorney, Agent, or Firm—Liniak, Berenato, Longacre & White

(57) ABSTRACT

A centrifugal pump includes a C-shaped sealing assembly including an annular spring disposed between opposing legs of a base member. The spring biases the legs away from one another into sealing positions. In other embodiments, a vertical pump may be provided so as to include an oil recirculation system which enables an oil-based lubricant to be utilized instead of grease. In still other embodiments, the axial location of a pump shaft may be adjusted by rotating a bearing housing relative to the bearing frame where the two are threadedly connected to one another.

3 Claims, 6 Drawing Sheets

VERTICAL PUMP WITH OIL LUBRICANT; C-SEAL FOR PUMP; AND PUMP WITH THREADED SHAFT POSITION ADJUSTMENT

This invention relates to: a C-seal for use in a pump; a vertical centrifugal pump with oil lubrication; a pump with threaded shaft position adjustment capability; and/or a pump including an anti-vibration wedge disposed between the bearing frame and bearing housing.

BACKGROUND OF THE INVENTION

Centrifugal chemical processing pumps are old and well-known in the art. For example, see U.S. Pat. No. 5,772,396, the disclosure of which is hereby incorporated herein by reference. Such pumps often utilize O-rings for certain sealing functions. Unfortunately, such O-rings are often designed so as to be temperature sensitive, and prone is to failure at very high temperatures. Thus, there exists a need in the art for a seal for use in any type of pump that is capable of withstanding high temperatures and/or corrosive materials or conditions.

Horizontally oriented pumps (e.g. see the '396 patent) typically utilize oil as a lubricant. However, known vertically oriented pumps often use grease as a lubricant instead of oil due to the vertical orientation and cost effectiveness. Grease is not as desirable as oil for lubrication purposes. Thus, there exists a need in the art for a vertical pump capable of using oil as a lubricant instead of grease.

Pump seal assemblies or dry ends are often designed so as to mechanically fit with only wet ends made by the manufacturer of the pump. Thus, there exists a need in the art for a pump capable of being easily adjustable so as to be capable of fitting different sized wet ends from a variety of manufacturers.

It is a purpose of this invention to fulfill any or all of the above-described needs in the art, as well as other needs which will become apparent to the skilled artisan from the following detailed description of this invention.

SUMMARY OF THE INVENTION

Generally speaking, this invention fulfills any or all of the above described needs in the art by providing a seal system for sealing a pump shaft to a first annular sleeve surround the shaft, the system comprising:

said pump shaft;

said first annular sleeve radially surrounding at least a portion of said shaft;

a second annular sleeve coaxial with said first sleeve, at least a portion of said second sleeve radially surrounding at least a portion of said first sleeve;

a flexible annular sealing member;

first and second annular support members disposed on opposite axial sides of said flexible annular sealing member, respectively, so that said flexible annular sealing member is at least partially axially between portions of said first and second annular support members; and wherein said second sleeve applies a force to at least one of said first and second annular support members thereby causing said flexible sealing member to be energized so as to form a seal between said shaft and said first annular sleeve.

This invention further fulfills any or all of the above described needs in the art by providing a centrifugal pump for pumping a fluid to be pumped, the centrifugal pump comprising:

a motor;

a fluid pumping impeller;

a shaft disposed between said motor and said impeller so that said motor can drive or rotate said shaft and said impeller;

at first seal having an annular rotating sealing member affixed to said shaft for rotation therewith and an annular stationary sealing member, said rotating and stationary sealing members working together to form a fluid sealing interface therebetween;

an approximately C-shaped annular sealing member having first and second flexible sealing legs spaced from one another; and an annular spring disposed between said first and second legs for biasing said first and second legs away from one another into respective sealing positions.

This invention further fulfills any or all of the above described needs in the art by providing a vertical pump comprising:

a rotatable shaft normally oriented in an approximately vertical manner;

a first bearing structure supporting said shaft;

a second bearing structure supporting said shaft, said second bearing structure being normally located entirely at an elevation above said first bearing structure;

an oil reservoir chamber located at an elevation below each of said first and second bearing structures;

an impeller affixed to said shaft for rotation therewith within said oil reservoir chamber; and said impeller including means for pumping oil from said oil reservoir chamber through at least a first passageway so that the pumped oil is reintroduced at an elevation above at least one of said first and second bearing structures.

In certain vertical pump embodiments, said impeller includes means for pumping oil out of said oil reservoir chamber through said first passageway and a second passageway so that oil that exits said chamber via said first passageway is reintroduced at an elevation above an elevation where oil that exits said chamber via said second passageway is. The means may be pumping vanes or other pumping structure in certain embodiments.

IN THE DRAWINGS

DETAILED DESCRIPTION OF CERTAIN EMBODIMENTS OF THIS INVENTION

Figure 1:
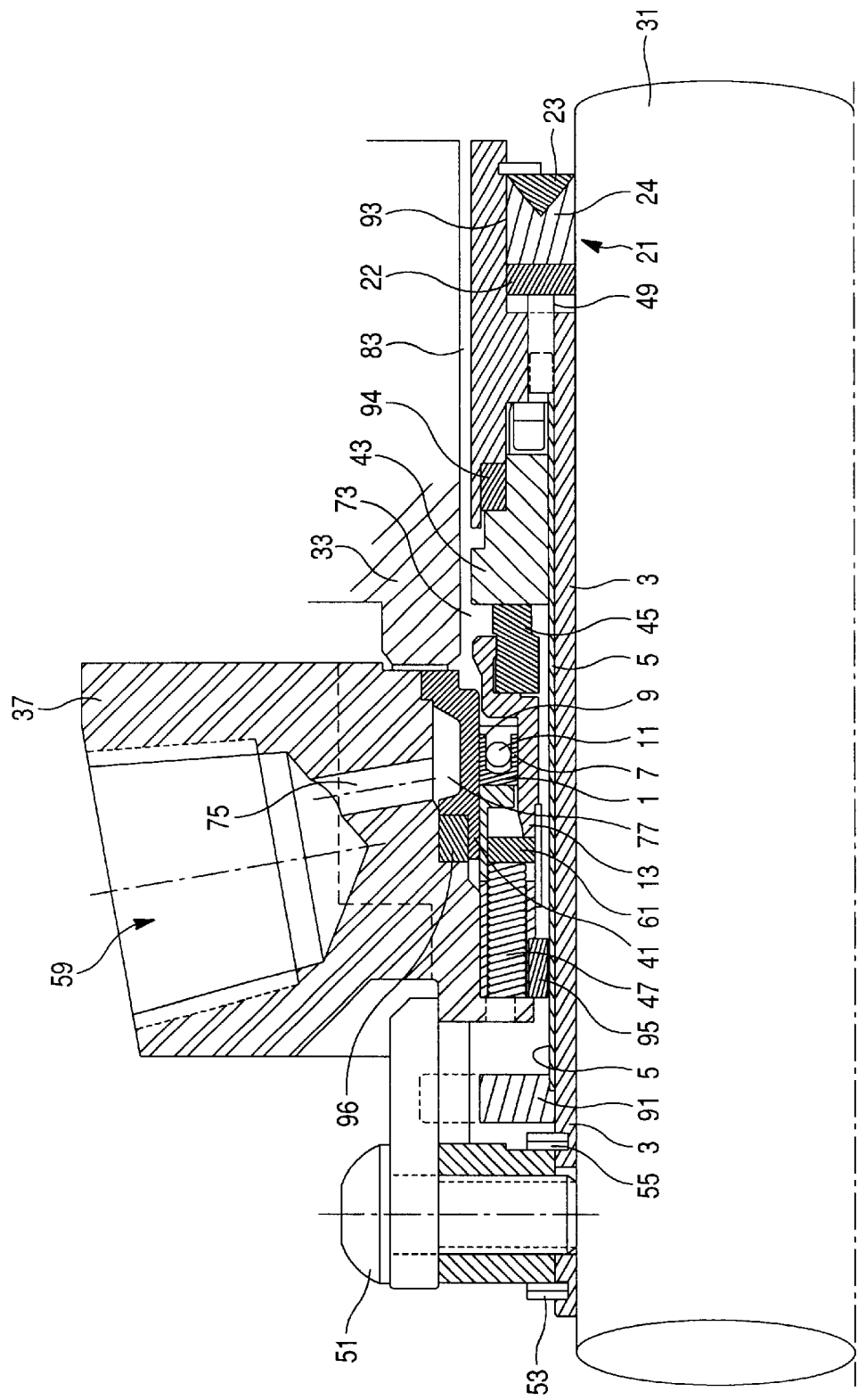
FIG. 1 is a side cross-sectional view of a portion of a centrifugal pump including a C-seal and dual sleeve design according to an embodiment of this invention.

Referring now more particularly to the accompanying drawings in which like reference numerals indicate like parts throughout the several views.

FIG. 1 is a side partial cross-sectional view of one-half of a portion of a centrifugal pump according to an embodiment of this invention (the half of the annular components on the other side of the pump shaft are not shown). The FIG. 1 embodiment includes C-shaped annular seal assembly 1 as well as first and second coaxial annular sleeves 3 and 5.

Seal assembly 1 includes a flexible approximately C-shaped annular sealing member including first and second flexible approximately parallel legs 7 and 9, respectively, which are interconnected by a base of the C-shaped sealing member. Annular spring 11 is provided between legs 7 and 9 in order to bias the two legs 7 and 9 outwardly away from one another so that each leg forms a sealing interface with a surface of an adjacent member (i.e. the springs functions to spread the legs into sealing positions). Thus, leg 7 is biased by spring 11 radially inward toward shaft 31 into sealing contact with a radially outer surface of approximately Z-shaped annular stator ring 13, while the other leg 9 of C-seal 1 is biased by spring 11 in a radially outward direction and into sealing contact with a radially inner surface of annular flush ring 41. Spring 11 may be a metallic (e.g. stainless steel) helical wound spring in certain embodiments. In other embodiments, spring 11 may be a cantilever spring, an etched spring, or a coil spring. In certain embodiments, the flexible body of the main body of seal assembly 1 including the legs may be made of a polymer (e.g. PBI). An exemplary C-seal assembly 1 may be obtained from EGC Corp., Houston Tex., Model 20A. Each of the aforesaid elements of seal assembly 1, as well as members 3, 5, 13, and 41 is annular and thus wraps around rotatable pump shaft 31.

While C-shaped seal 1 is shown in the FIG. 1 embodiment in between flush ring 41 and stator ring 13, such an annular approximately C-shaped seal assembly 1 may also be positioned in any other location in either a horizontally or vertically oriented centrifugal pump where radially inwardly and outwardly biasing sealing forces are required. Thus, many O-rings in conventional pumps may be replaced with C-shaped seal assembly 1.

Seal assembly 1 may be exposed to much higher temperatures (e.g. up to 800 degrees F. in certain embodiments) than conventional O-rings, without failing. Seal 1 is also anti-corrosive in nature due to its design and polymer base. It is noted that seal assembly 1 does not rotate with shaft 31.

FIG. 1 illustrates the section of the pump in which the majority of the seal flushing system and seal 1 are located. The remainder (e.g. shaft, motor, impeller, etc.) of the centrifugal pump according to this embodiment, exclusive of what is illustrated in FIG. 1, is disclosed, for example, in U.S. Pat. No. 5,494,299, the disclosure of which is hereby incorporated herein by reference.

The centrifugal pump according to the FIG. 1 embodiment includes (or further includes) rotatable pump shaft 31 (illustrated non-cross-sectionally) adapted to be driven by the pump motor, stationary pump stuffing box 33, inner sleeve 3 affixed to shaft 31 for rotation therewith, outer sleeve 5 surrounding and coaxial with the inner sleeve, gland 37 which remains stationary while shaft 31 rotates, removable flush ring insert 41, a seal made up of annular rotating sealing member 43 which rotates along with shaft 31 and stationary annular sealing member 45, a plurality of radially spaced biasing springs 47, a plurality (e.g. five to ten) of radially spaced pins 49 for actuating annular seal assembly 21 including annular metal rings 22 and 23 which surround flexible graphite inclusive annular sealing ring 24, a plurality of radially extending set screws 51, snap ring 53, snap ring 55, flush port 59, and mounting bolts with corresponding nuts (not shown) for attaching the flush/seal gland 37 to stuffing box 33 and thus to the pump. Springs 47 bias or push support/antirotation ring 61 which in turn allows shrunk-fit Z-shaped metallic member 13 to be biased or pushed thereby causing stationary carbon sealing member 45 to be biased into fluid sealing interface with rotating sealing member 43. With regard to the seal, annular rotating sealing member 43 rotates along with shaft 31. Its companion, annular stationary sealing member 45, remains stationary along with gland 37 and sealing assembly 1 during pump operation.

Annular gland 37 extends radially outward from sleeves 3 and 5 and thereby surrounds pump shaft 31 on all sides. A single flush port 59 is defined in gland 37 for the purpose of allowing the flush liquid to flow toward annular flush chamber 73. Annular flush chamber 73 surrounds the exterior periphery of each of rotating sealing member 43, stationary sealing member 45, and their fluid sealing interface.

In fluid communication with flush port 59 is passageway 75 (defined in gland 37) and annular flow chamber 77. Chamber 77 surrounds pump shaft 31 and is located between the inner periphery of a portion of gland 37 and the exterior periphery of a portion of flush ring insert 41. Pressurized flushing liquid flowing through port 59 and passageway 75 flows into chamber 77 and flows through this chamber around shaft 31. From annular flow chamber 77, the flushing liquid proceeds through a plurality of radially spaced flush apertures or holes (not shown) defined in flush ring insert 41 and into annular flush chamber 73 so as to flush the sealing interface between members 43 and 45.

By providing a plurality of radially spaced flush apertures around the circumference of shaft 31 and the sealing interface, the resulting flush flow into chamber 73 is akin to a shower-head effect in that the seal interface between 43 and 45 is flushed at a plurality of different locations along its periphery with substantially the same force at each place.

After the liquid (e.g. either water or the liquid being pumped) in chamber 73 flushes (i.e. cleans and/or cools) the sealing interface, sealing member 43, and sealing member 45, the liquid flows axially along shaft 31 through annular exit passageway 83.

In alternative embodiments of this invention, ring insert 41 does not include any flushing apertures therein (i.e. it is a solid annular member). In such embodiments, fluid from port 59 flows into annular chamber 77 and then flows therethrough around the radially outer periphery of member 41 in order to perform a cooling function. A separate output port (not shown) may be provided in such embodiments for allowing the cooling fluid to exit cooling chamber 77.

The cartridge seal of FIG. 1 also allows for the use of an optional vapor shield and throttle bushing. A steam quench and drain may be used to purge coked material from the outboard side of the primary seal faces. The throttle bushing may be used to restrict leakage to atmosphere in the event of a catastrophic seal failure.

Seal 21 functions as follows. Flexible graphite inclusive sealing member 24 is not self energizing, and thus must be energized mechanically by pressing on it and/or squeezing it. Inner sleeve 3 is affixed to shaft 31 for rotation therewith, as is outer seal energizing sleeve 5. Energizing sleeve 5 is preferably thinner than inner sleeve 3 as shown in FIG. 1, and is located radially outward of at least a portion of main sleeve 3. By locating energizing sleeve 5 radially outward of sleeve 3, sleeve 5 has adequate clearance to operate properly and allows a full length of main seal sleeve 3 to assure proper centering of the rotating seal components described above relative to the stationary seal components. One end of outer annular sleeve 5 is held in place by annular support 91, and the other end of sleeve 5 presses or forces a plurality of radially spaced pins 49 which in turn cause flexible annular sealing member 24 to be compressed between metal rings 22 and 23. Ring 22 may be rectangular in cross section, while ring 23 may be triangular in cross section in certain embodiments. When sealing member 24 is compressed between rings 22 and 23, the radially inner and outer peripheries of member 24 are squeezed or forced radially inwardly and outwardly, respectively, into sealing interfaces with shaft 31 and the inner surface at 93 of a step portion of the inner sleeve 3. Seal 21 thus seals fluid against movement along shaft 31, thereby sealing the inner sleeve 3 to the pump shaft 31. The FIG. 1 design in this regard also allows for a larger size of graphite sealing member 24 than otherwise is possible in conventional seal systems. In certain embodiments, flexible sealing member 24 (as well as flexible sealing members 94–96) may be made of a flexible graphite inclusive material such as Grafoil, available from UCAR Carbon Company, Inc.

Figure 2:
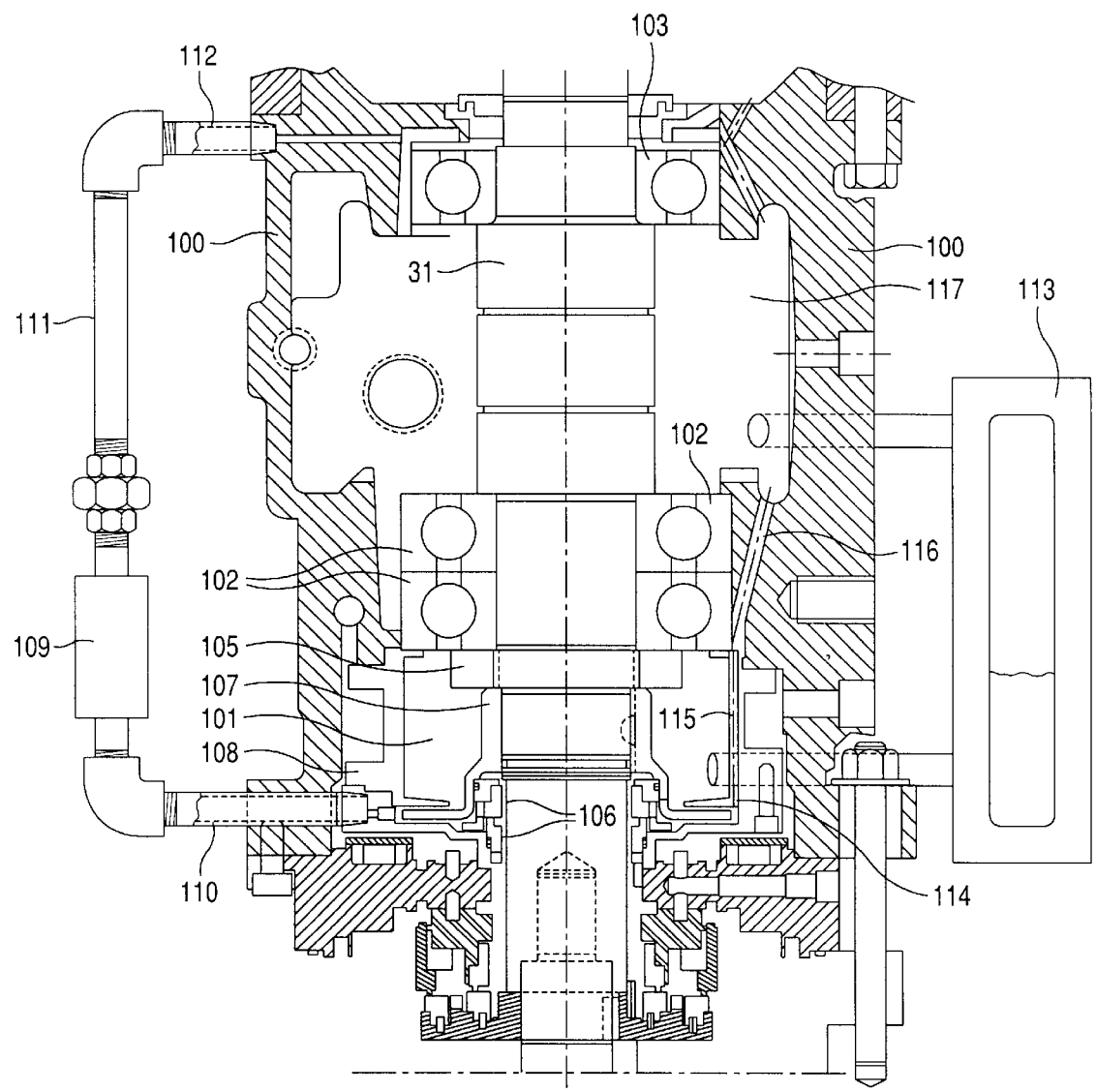
FIG. 2 is a side partial cross sectional view of a vertical centrifugal pump lubricated by oil or other liquid according to an embodiment of this invention.
Figure 3:
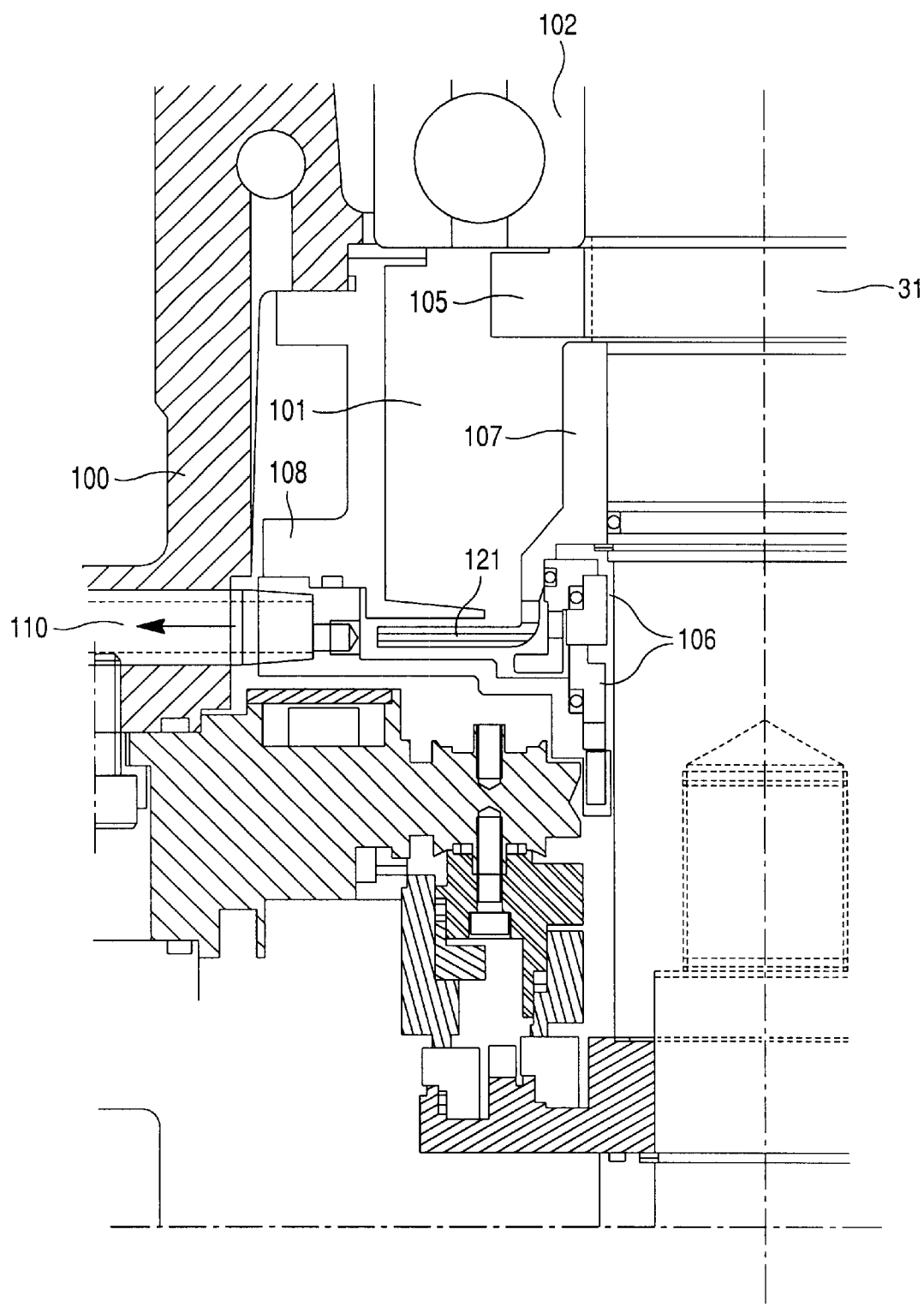
FIG. 3 is an enlarged side partial cross sectional view of a portion of one half of the FIG. 2 pump.

FIGS. 2–3 illustrate another embodiment of this invention relating to a vertical centrifugal pump capable of being lubricated by oil or some other liquid. The pump of the FIGS. 2–3 embodiment includes rotatable pump shaft 31, oil chamber or sump 101 surrounding the shaft, double row bearings 102 supporting the shaft, each bearing including ball bearings and corresponding raceways, single row bearings 103 supporting the shaft, nut 105 affixed to the shaft, bearing frame 100, casing mechanical seal 106, oil pumping impeller 107 affixed to shaft 31 for rotation therewith in oil chamber 101, and stationary impeller back cover 108. Each of the aforesaid elements is annular in that each surrounds the pump shaft. The pump further includes oil filter 109, main oil recirculation system including outlet 110, pipe 111 and inlet 112, oil level gauge 113, and secondary oil recirculation system including approximately vertically oriented outlet 114, vertically extending passageway 115 defined in impeller back cover 108, and passageway 116 for allowing oil to flow into lubrication chamber 117 at an elevation above double row bearings 102. This system enables the illustrated pump to be lubricated by oil, instead of grease.

Still referring to the vertical pump embodiment of FIGS. 2–3, operation of the system is described as follows. Oil or other lubricating fluid is provided in oil chamber 101, preferably to a level just below nut 105. Mechanical seal(s) 106 prevents the oil from leaking out of the sump. The pump discharges oil through two areas from reservoir 101. When the pump's motor drives shaft 31, the shaft is rotatingly supported by bearings 102 and 103 which require lubrication. Impeller 107 rotates along with the pump shaft in chamber 101. During rotation of oil pumping impeller 107, pumping vanes 121 of impeller 107 cause oil in chamber 101 to be pumped radially outwardly into both main outlet passage 110 and secondary outlet passage 114 (the opening for passage 114 is preferably a vertically oriented hole).

This pumping effect imparted by the rotating vanes 121 of impeller 107 causes oil from the chamber to exit via main outlet 110, pass through filter 109, and proceed vertically upwardly through pipe 111 and back through oil inlet 112 into a location within bearing frame 100 at an elevation at or above uppermost bearings 103. This oil then, due to gravity, drips or flows downward through and around bearings 103 in order to lubricate them, and thereafter into chamber 117, and thereafter downward through and around bearings 102 in order to lubricate the same, and finally back into oil reservoir 101 or sump 101.

In addition, the pumping action of impeller 107 and its pumping vanes 121 causes oil from chamber 101 to be pumped out through secondary outlet 114, upwardly through passageway 115 that is defined in the impeller back cover 108, and then upwardly through connecting passageway 116 defined in the bearing frame, from which the oil flows out into chamber 117 at an elevation above bearings 102. This oil then flows downwardly through and around bearings 102 in order to lubricate the same, and back into chamber 101. Optionally, a passageway may also be provided from passageway 115 directly to bearings 102, in order to more directly lubricate the double row bearings 102.

Thus, in accordance with the FIGS. 2–3 embodiment, the oil impeller system pumps lubricating oil from chamber 101 upwardly through first and second different passageways. One of the passageways reintroduces pumped oil at an elevation at or above both sets of bearings 102 and 103; while the other reintroduces pumped oil at an elevation at or above only one of the bearings 102 but below the other 103. This system enables the bearing structures of the pump to be properly lubricated, despite the fact that the shaft and pump itself are normally approximately vertically oriented.

Figure 4:
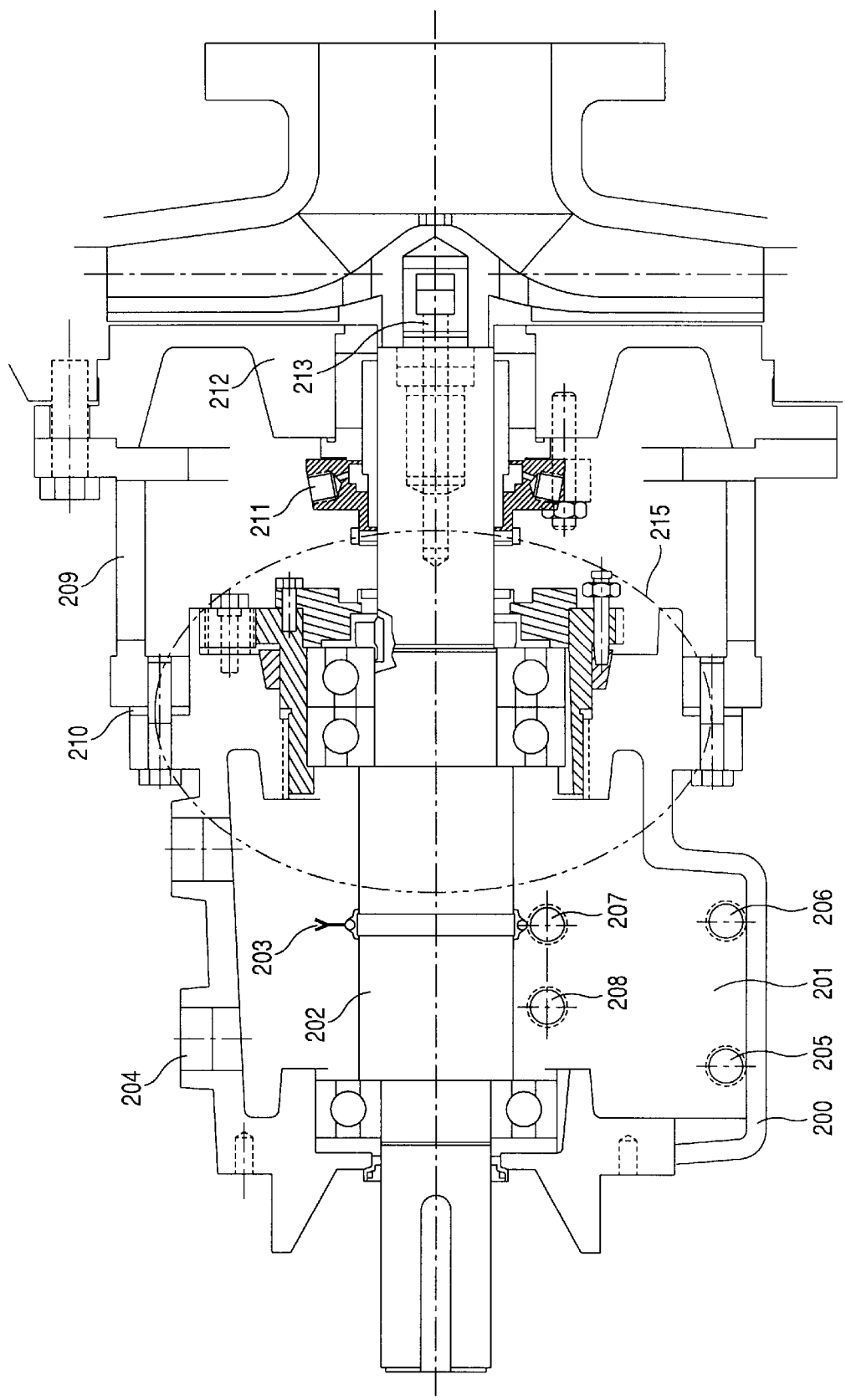
FIG. 4 is a side partial cross sectional view of a centrifugal pump including a dry end easily adjustable in order to fit on different sized wet ends.
Figure 5:
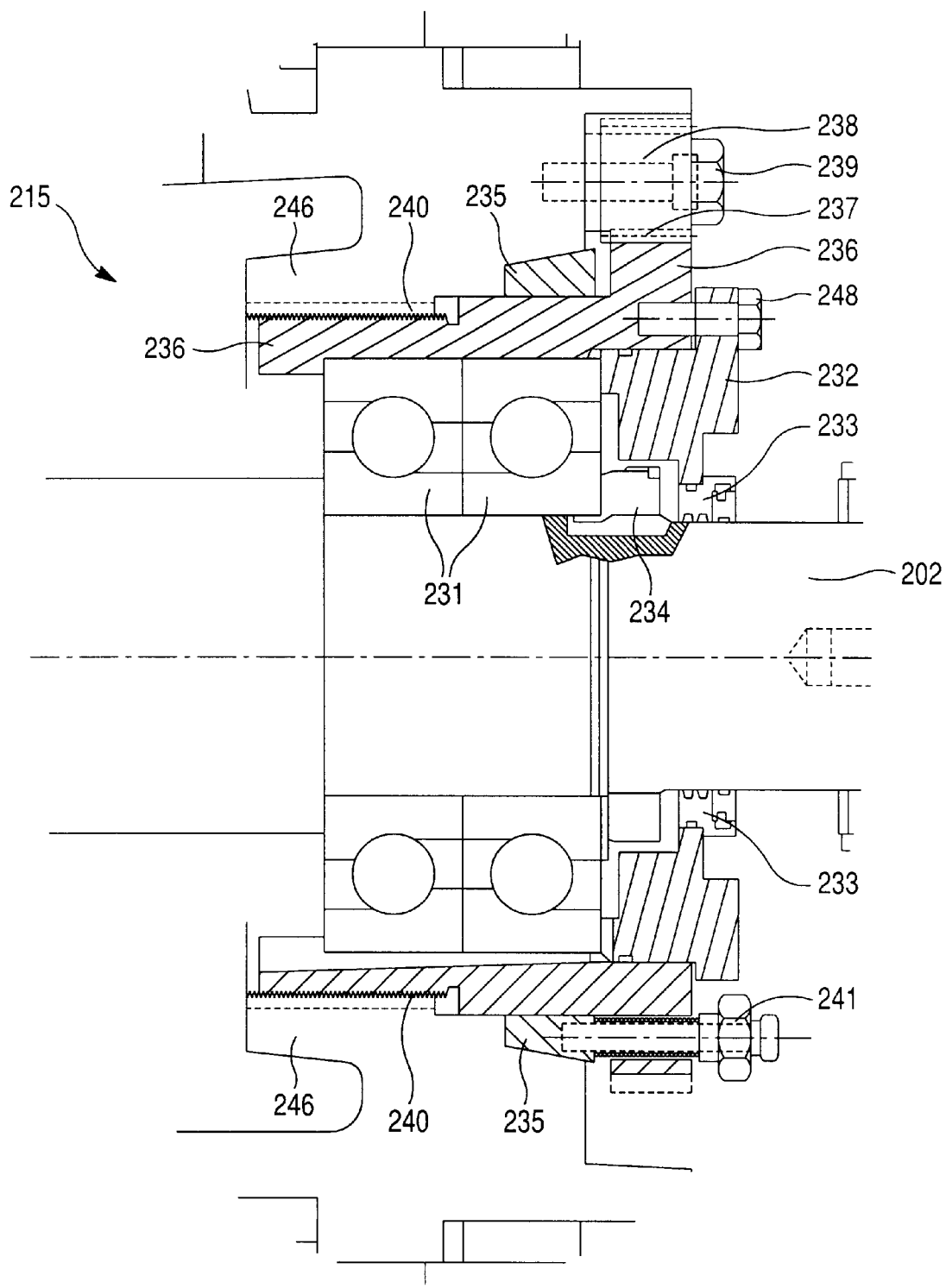
FIG. 5 is an enlarged side partial cross sectional view of a seal assembly portion of the FIG. 4 pump circled in a dotted line in FIG. 4.
Figure 6:
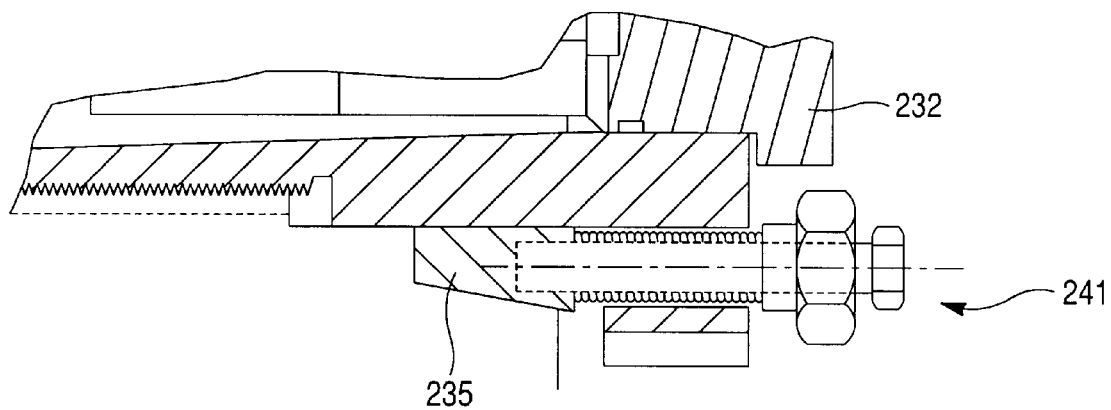
FIG. 6 is an enlarged side partial cross sectional view of the wedge assembly of FIGS. 4–5.

FIGS. 4–6 illustrate a centrifugal pump according to yet another embodiment of this invention. This pump includes heavy duty bearings designed for oil lubrication. Bearing lubrication may be accomplished by internal oil misting, internal ring oil lubricating, external sources of oil, and/or flood oil. Moreover, the device is capable of being fitted with an internal cooling device if desired. The double row thrust bearing is in an inboard position in order to give the pump shaft additional stiffness in order to reduce vibration and deflection during operation.

Referring to FIGS. 4–6, the pump includes bearing frame 200, lubricating oil reservoir chamber 201, rotatable pump shaft 202, oil mister assembly 203 affixed to shaft 202, inspection port 204, oil cooler port 205, oil return/drain port 206, oil circulation ports 207, oil level sight glass 208, rigid frame adapter 209, spacer ring 210 whose thickness may be adjusted to suit different applications, conventional double axial seal 211, stuffing box 212, shaft stub 213 with center locking bolt, and forward bearing housing and shaft adjusting assembly 215. Because different wet end s a re of different sizes, adapter and/or spacer 210 can be adjusted to fit different wet ends. For example, in certain preferred embodiments, adapter 209 may remain the same for all wet ends, while one can change the thickness of annular spacer 210 in order to adjust the overall length of the product and adapt it to fit a desired wet end. Thus, many different sizes of spacers 210 may be used depending upon the application.

The purpose of forward bearing housing and shaft adjusting assembly 215 is to enable the seal assembly or the dry end of the pump to be adjustable in order to fit different sized wet ends. The seal housing of FIGS. 4–6 can be configured in a variety of ways so as to accomodate and fit with many different manufacturer's mechanical seals (or packings), and provide a variety of seal housing features such as large bore, tapered bore, slurry excluders, vanes, and the like. Moreover, the shaft is adjustable so that the power frame can be attached to most pump wet ends on the market by altering the wet end adapter pieces and/or shaft location. The frame adapter which bolts directly to the power frame is designed to be mounted to either side of the frame flange giving it added adjustability and versatility when attaching to various wet ends on the market. This seal flange is also capable of being used with a c-flange motor adapter.

Referring more particularly to FIG. 5, adjusting assembly 215 includes back-to-back single row thrust bearings 231, annular bearing cover 232, annular labyrinth seal assembly 233, bearing lock nut and lock washer 234, anti-vibration tapered annular locking wedge 235, bearing housing 236, gear teeth 237 provided on the radially outer diameter of bearing housing 236, twelve tooth driver gear 238, bolt 239 for allowing driver gear 238 to be driven thereby, threaded interface or connection between bearing frame 246 and bearing housing 236, and locking/unlocking screw assembly 241 for locking and unlocking wedge 235 in position. Certain of these elements are also illustrated in an enlarged fashion in FIG. 6.

Referring to FIGS. 4–6, the axial position of shaft 202 may be adjustable due to the provision of the threaded connection 240 between bearing housing 236 and bearing frame 246. This threaded connection allows fine adjustability of the axial position of pump shaft 202. The axial position of shaft 202 may be adjusted or changed depending upon the particular wet end desired to be interfaced with. Different sized wet ends require different pump shaft positions. The outer diameter of the flange of housing 236 includes integral gear teeth 237 which engage small rotatable gear 238 which is turned using a wrench on ratchet on bolt heaad 239 in order to rotate the housing 236 thereby enabling it to move axially due to the threads. When housing 236 moves axially, bearings 231 and pump shaft 202 move axially along with it.

By way of example, an operator utilizing a wrench may rotate bolt 239 in a clockwise direction thereby causing gear 238 to also rotate in a clockwise direction. This rotation of gear 238 causes housing 236 via teeth 237 to rotate in a counterclockwise direction about the axis of the pump shaft due to the toothed connection at 237 between elements 238 and 239. When housing 236 rotates counterclockwise relative to bearing frame 246, the bearing frame remains stationary while housing 236 backs out of the frame (i.e. housing 236 moves to the right as shown in FIG. 5 relative to frame 246). This causes shaft 202 to move to the right relative to stationary frame 246.

Annular anti-vibration wedge 235 is wedged between an inner radial surface of bearing frame 246 and an outer radial surface of bearing housing 236. The cross-section of annular wedge 235 may be approximately conical frustrum in shape in certain embodiments, but may be approximately triangular in other embodiments. Wedge 235 may be wedged into place using bolt or screw assembly 241. For example, in certain embodiments, in order to lock wedge 235 in place after the pump shaft is in its desired position, a plurality of the larger screws or bolts of assembly 241 are tightened until the wedge is firmly seated in the position shown in FIG. 5. This provides additional vibration resistance during pump operation by eliminating looseness effects of a three piece assembly (bearing/bearing housing/bearing frame) and providing a metal-to-metal interface between the bearing frame 246 and the bearing housing 236 while maintaining the axial adjustability of the rotating shaft assembly. In preferred embodiments of this invention, each of wedge 235, frame 246, and housing 236 are made of metal.

In certain preferred embodiments as illustrated in FIGS. 5 and 6, each of the plurality of assemblies 241 includes first and second axially aligned screws or bolts; one smaller and one larger, with the smaller one within the larger one. As illustrated, the smaller screw may be screwed into or through the larger screw from the rear thereof, while the larger screw is threadedly attached to the bearing housing 236. The distal end of the smaller screw threadedly engages wedge 235 in order to prevent rotation of the wedge during pump operation. Thus, wedge 235 may be loosened or removed by loosening the largest screws until the large screw head pushes against the underside of the smaller screw's head. Loosening may be continued alternately between the small screw and the large screw of each assembly until the wedge becomes unseated.

Once given the above disclosure, therefore, various other modifications, features, or improvements will become apparent to the skilled artisan. Such other features, modifications, and improvements are thus considered a part of this invention, the scope of which is to be determined by the following claims.

I claim:

1. A vertical pump comprising:

a rotatable shaft normally oriented in an approximately vertical manner;

a first bearing structure supporting said shaft;

a second bearing structure supporting said shaft, said second bearing structure being normally located entirely at an elevation above said first bearing structure;

an oil reservoir chamber located at an elevation below each of said first and second bearing structures;

an impeller affixed to said shaft for rotation therewith within said oil reservoir chamber; and said impeller including means for pumping oil from said oil reservoir chamber through at least a first passageway so that the pumped oil is reintroduced at an elevation above at least one of said first and second bearing structures; and wherein said impeller includes means for pumping oil out of said oil reservoir chamber through said first passageway and a second passageway so that oil that exits said chamber via said first passageway is reintroduced at an elevation above an elevation where oil that exits said chamber via said second passageway is.

2. The vertical pump of claim 1, wherein said second passageway is at least partially defined in an impeller back cover.

3. The vertical pump of claim 1, wherein said means includes pumping vanes located on at least one extremity of said impeller.

\* \* \* \* \*